United States Patent
Chang et al.

(10) Patent No.: US 11,954,271 B2
(45) Date of Patent: Apr. 9, 2024

(54) ACTIVE STYLUS AND METHOD PERFORMED BY ACTIVE STYLUS

(71) Applicant: NOVATEK MICROELECTRONICS CORP., Hsinchu (TW)

(72) Inventors: Weijen Chang, Tainan (TW); Chin-Lin Lee, Hsinchu (TW)

(73) Assignee: NOVATEK MICROELECTRONICS CORP., Hsinchu (TW)

( * ) Notice: Subject to any disclaimer, the term of this patent is extended or adjusted under 35 U.S.C. 154(b) by 0 days.

(21) Appl. No.: 18/117,003

(22) Filed: Mar. 3, 2023

(65) Prior Publication Data

US 2023/0280843 A1    Sep. 7, 2023

Related U.S. Application Data

(60) Provisional application No. 63/316,413, filed on Mar. 4, 2022.

(51) Int. Cl.
| | |
|---|---|
| *G06F 3/0354* | (2013.01) |
| *G06F 3/038* | (2013.01) |
| *G06F 3/041* | (2006.01) |
| *G06F 3/044* | (2006.01) |
| *H04W 72/21* | (2023.01) |

(52) U.S. Cl.
CPC ........ *G06F 3/03545* (2013.01); *G06F 3/0383* (2013.01); *G06F 3/04162* (2019.05); *G06F 3/04182* (2019.05); *G06F 3/0441* (2019.05); *G06F 3/0442* (2019.05); *H04W 72/21* (2023.01)

(58) Field of Classification Search
CPC ............ G06F 3/03545; G06F 3/04182; G06F 3/044–0442; G06F 3/04162; G06F 3/0383
See application file for complete search history.

(56) References Cited

U.S. PATENT DOCUMENTS

| | | | | |
|---|---|---|---|---|
| 2014/0368473 | A1* | 12/2014 | Chang | G06F 3/04162 345/179 |
| 2017/0255281 | A1* | 9/2017 | Gordon | G06F 3/03545 |
| 2023/0350514 | A1* | 11/2023 | Barel | G06F 3/0383 |

* cited by examiner

*Primary Examiner* — Hang Lin
(74) *Attorney, Agent, or Firm* — MARSHALL, GERSTEIN & BORUN LLP

(57) ABSTRACT

An active stylus and a method performed by the active stylus are provided. The active stylus includes a touch sensor inside. The touch sensor is arranged corresponding to a preset pen-holding region on an outer surface. The touch sensor is insulated from the pen body, when an external operating subject touches the preset pen-holding region and touches a touch panel, an uplink signal transmitted by the touch panel is coupled to the pen body via the external operating subject, as an uplink interference signal. The signal processing unit is for: generating a compensation signal; obtaining a compensated interference signal generated based on the compensation signal and the uplink interference signal; generating an uplink signal to be processed based on the received uplink signal and the compensated interference signal; and obtaining uplink information based on the uplink signal to be processed.

16 Claims, 11 Drawing Sheets

ACTIVE STYLUS AND METHOD PERFORMED BY ACTIVE STYLUS

TECHNICAL FIELD

The present disclosure relates to a field of touch control technology, and more particularly, to an active stylus and a method performed by the active stylus.

BACKGROUND

With development of man-machine interface, people starts to use an input interface of an electronic apparatus to perform pen-writing input, drawing and other actions, so various passive stylus/active stylus products come into being, and a display panel and a driving circuit in the electronic apparatus (for example, a touch display apparatus) are usually equipped with a corresponding function of interacting with a passive stylus/active stylus. The electronic apparatus is, for example, a mobile phone, a tablet computer, a computer, a personal digital assistant (PDA), or the like.

Currently, an active stylus on the market has a function of bidirectional communication. The active stylus and a touch panel (or a touch display panel) can communicate with each other in two directions through uplink/downlink (UL/DL) signals to provide a user with more support and convenience. The bidirectional communication provided by the active stylus includes, for example, transmitting a UL signal by the driving circuit (take a touch and display driver integrated (TDDI) chip as an example) and transmitting a DL signal by the active stylus. The UL signal carries instructions (which may be encoded) that the TDDI chip needs to transmit to the active stylus. The DL signal is generated by the active stylus based on the received UL signal, and carries instructions (which may be encoded) that the active stylus needs to transmit to the TDDI chip. The instructions carried by the UL signal (which may be encoded) may include information such as a manufacturer code, DL timing that the active stylus should adopt, a frequency at which the active stylus transmits the DL signal, an operating mode of the active stylus, and the like.

Therefore, it is very important to ensure the normal bidirectional communication between the active stylus and the driving circuit for implementation of the function of the active stylus.

SUMMARY

According to one aspect of the present application, there is provided an active stylus. The active stylus includes: a touch sensor, arranged inside the active stylus and along at least a portion of an inner surface region of a pen body (also referred to as pen casing) of the active stylus, the at least a portion of the inner surface region corresponding to a preset pen-holding region on an outer surface of the pen body, wherein, the touch sensor is insulated from the pen body, and when an external operating subject touches the preset pen-holding region and touches a touch panel, an uplink signal transmitted by the touch panel is coupled to the pen body via the external operating subject, as an uplink interference signal; a receiver, configured to receive the uplink signal from the touch panel; and a signal processing unit, configured to: generate a compensation signal for compensating the uplink interference signal, and obtain a compensated interference signal generated based on the compensation signal and the uplink interference signal; and obtain uplink information based on the uplink signal to be processed.

According to another aspect of the present application, there is also provided a method performed by an active stylus. The active stylus includes: a touch sensor, arranged inside the active stylus and along at least a portion of an inner surface region of a pen body of the active stylus, the at least a portion of the inner surface region corresponding to a preset pen-holding region on an outer surface of the pen body, wherein, the touch sensor is insulated from the pen body, and when an external operating subject touches the preset pen-holding region and touches a touch panel, an uplink signal transmitted by the touch panel is coupled to the pen body via the external operating subject, as an uplink interference signal. The method includes: receiving the uplink signal from the touch panel; generating a compensation signal for compensating the uplink interference signal, and obtaining a compensated interference signal generated based on the compensation signal and the uplink interference signal; generating an uplink signal to be processed based on the received uplink signal and the compensated interference signal; and obtaining uplink information based on the uplink signal to be processed.

In embodiments of the present application, by generating a compensation signal and transmitting it to touch sensing electrodes of the touch sensor in the active stylus, interference caused by the UL signal coupled to the pen body of the active stylus through the external operating subject (such as a user' palm, etc.) can be reduced, to increase (enhance) an intensity (or strength) of the uplink signal actually received by the active stylus without modifying a driving mode for the touch panel. Therefore, during an uplink transmission period of the active stylus (the active stylus receives the uplink signal from the touch panel), all touch sensing electrodes on the touch panel can transmit uplink signals, which also improves the intensity of the uplink signal actually received by the active stylus.

DETAILED DESCRIPTION

Figure 1:
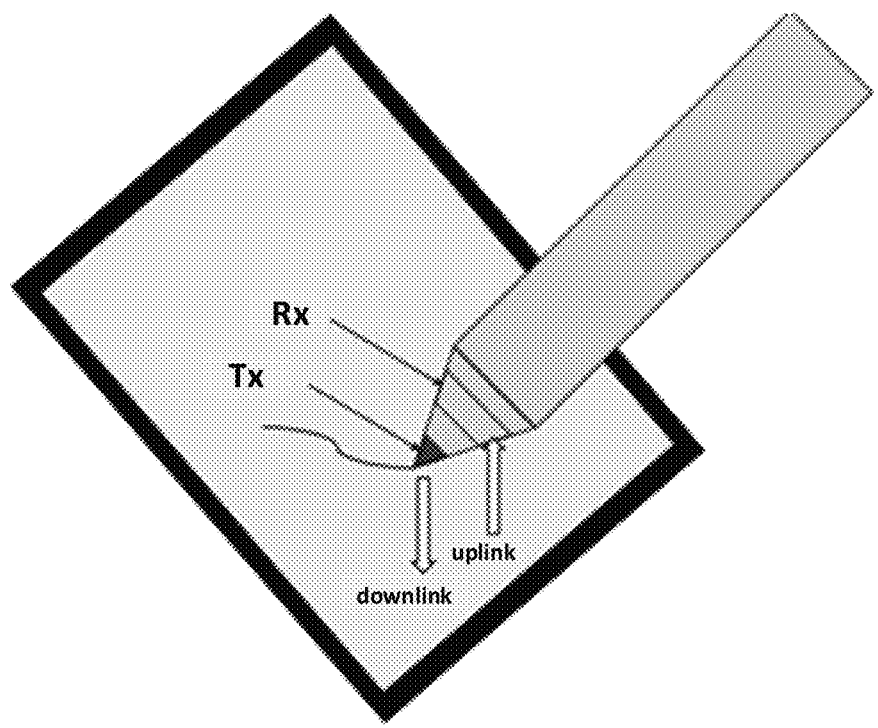
FIG. 1 shows a schematic diagram of bidirectional communication between an existing capacitive active stylus and a touch panel (or touch display panel).

In order to make the objective, technical solutions and advantages of the embodiments of the present disclosure clearer, the technical solutions of the embodiments of the present disclosure will be clearly and completely described below in conjunction with the accompanying drawings. Apparently, the described embodiments are some but not all of the embodiments of the present disclosure. Based on the described embodiments of the present disclosure, all other embodiments obtained by a person of ordinary skill in the art without inventive effort fall within the protection scope of the present disclosure.

Unless otherwise defined, the technical terms or scientific terms used in the present disclosure should be of general meaning as understood by those ordinarily skilled in the art. In the present disclosure, words such as "first", "second" and the like do not denote any order, quantity, or importance, but rather are used for distinguishing different components. Similarly, words such as "one", "a/an" or "the" or the like do not denote quantitative limitation, but rather indicate there is at least one. An expression in singular form may include an expression in plural form, and vice versa, unless clearly defined in context. Words such as "include" or "comprise" and the like denote that components or objects appearing before the words of "include" or "comprise" cover the components or the objects enumerated after the words of "include" or "comprise" or equivalents thereof, not exclusive of other components or objects.

In addition, elements/components/steps with the same reference numerals represent the same or similar portions in the drawings and embodiments. For elements/components/steps with the same reference numerals in different embodiments, reference may be made to related descriptions.

FIG. 1 shows a schematic diagram of the bidirectional communication between an existing capacitive active stylus and a touch panel (or touch display panel).

In FIG. 1, a touch sensing electrode of the touch panel (a gray region in a solid line rectangle in the drawing) transmits an uplink signal (referred to as a UL signal) to a receiver circuit Rx of the active stylus (not shown, generally located near a tip of the active stylus) for pairing communication. The UL signal is transmitted to the active stylus by the driving circuit of the touch panel via the touch panel. After successful pairing, the active stylus transmits a downlink signal (referred to as a DL signal) from a transmitter circuit Tx (not shown, generally located at the tip of the active stylus) to the touch panel and then to the driving circuit as a report point (i.e., for reporting a touch position). When the active stylus approaches or touches the touch panel, the active stylus receives the UL signal and makes a response, such as mode switching and frequency setting of the active stylus.

However, when a size of the touch panel gradually increases, taking an external operating subject as a user's hand as an example, in addition to the tip of the active stylus, some body parts of the user (for example, a palm or wrist of a pen-holding hand, or a palm or finger of a non-pen-holding hand, etc.) are easier to touch the touch panel simultaneously. Based on a physical characteristic of a human body being a conductor, when the user uses the active stylus, the UL signal transmitted by the driving circuit (such as a TDDI chip) in an electronic apparatus through the touch sensing electrodes of the touch panel will not only be received by the receiver circuit Rx of the active stylus, but also received by other body parts of the user and transmitted to a pen body (also referred to as "pen casing" or "pen shell") of the active stylus. The pen body shares a system ground (or reference ground) of a signal processing unit in the active stylus. That is, the pen body may act as the system ground of the signal processing unit. For the UL signal ($Panel_{UL}$) received by the receiver circuit Rx in the active stylus, a UL signal coupled to the system ground of the signal processing unit in the active stylus through the human body ($Body_{UL}$, which is also referred to as: a UL signal coupled to the active stylus through the human body, and whose intensity (or amplitude or voltage value) is also represented as $Body_{UL}$ in order to facilitate description later) is an interference signal. In other words, an intensity of the UL signal actually received by the signal processing unit of the active stylus ($Pen_{UL}$, which is also referred to as: a UL signal actually received by the active stylus, and whose intensity (or amplitude or voltage value) is also represented as $Pen_{UL}$ in order to facilitate description later) is equivalently an intensity of the UL signal ($Panel_{UL}$) transmitted through the touch sensing electrodes of the touch panel (also represented as $Panel_{UL}$) minus an intensity of the UL signal ($Body_{UL}$) coupled to the active stylus through the human body, which is described by a formula: $Pen_{UL}=Panel_{UL}-Body_{UL}$. If a coupling effect of the human body is serious, UL transmission may be interrupted, resulting in failure of the active stylus to transmit the DL signal. As a result, a writing effect of the active stylus is poor, for example, there are broken lines or broken points in drawn lines.

In the context of the present application, the intensity of the UL signal, the UL interference signal or the compensated interference signal, etc. is positively correlated with the voltage value and amplitude of these signals and therefore expressions "intensity", "voltage value" and "amplitude" can be used interchangeably.

Figure 2A:
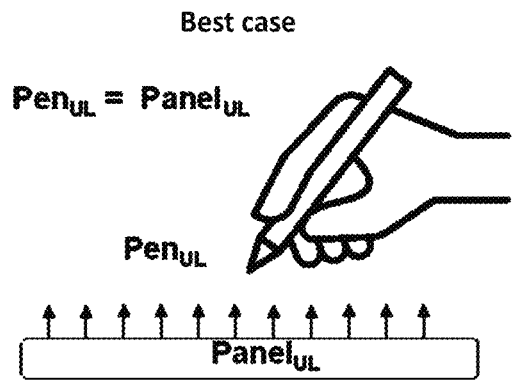
FIGS. 2A-2C each schematically shows impact on an intensity (or voltage value or amplitude) of the UL signal actually received by the active stylus when some body parts of the user touch the touch panel.
Figure 2B:
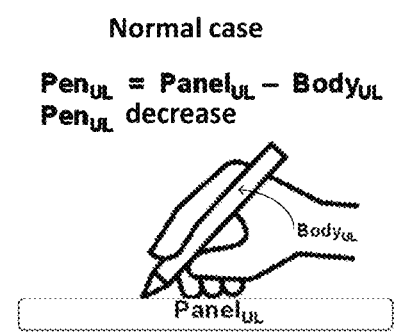
Figure 2C:
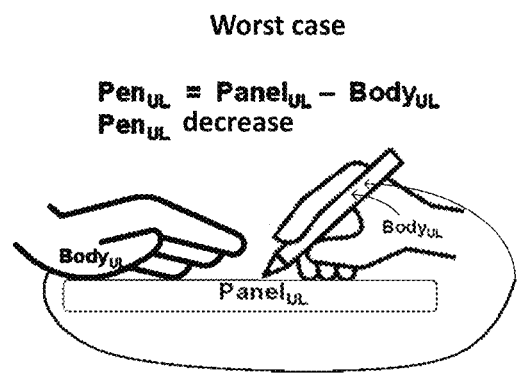

FIGS. 2A-2C each schematically shows impact on the intensity of the UL signal actually received by the active stylus when some body parts of the user touch the touch panel.

As shown in FIG. 2A, when the user's non-pen-holding hand and pen-holding hand do not approach or contact (collectively referred to as "touch") the touch panel, that is, in a best case, the intensity (shown as $Pen_{UL}$) of the UL signal actually received by the active stylus is substantially the same as the intensity (shown as $Panel_{UL}$) of the UL signal transmitted through the touch sensing electrodes.

As shown in FIG. 2B, when a part of the palm of the user's pen-holding hand approaches or contacts (collectively referred to as "touches") the touch panel, that is, in a normal case, because the UL signal transmitted through the touch sensing electrodes of the touch panel will not only be received by the tip of the active stylus, but also received by the palm of the user and transmitted to the pen body of the active stylus (the pen body shares the system ground of the signal processing unit), the intensity of the UL signal actually received by the active stylus is a differential value between the intensity of the UL signal transmitted through the touch sensing electrodes and the intensity of the UL signal (referred to as a UL interference signal, shown as $Body_{UL}$) received through the palm, that is, the intensity of the UL signal ($Pen_{UL}$) actually received by the active stylus will decrease.

In addition, as shown in FIG. 2C, the user's non-pen-holding hand may also contact or approach the touch panel, which is a worst case, which will further reduce the intensity of the UL signal actually received by the active stylus.

Figure 3A:
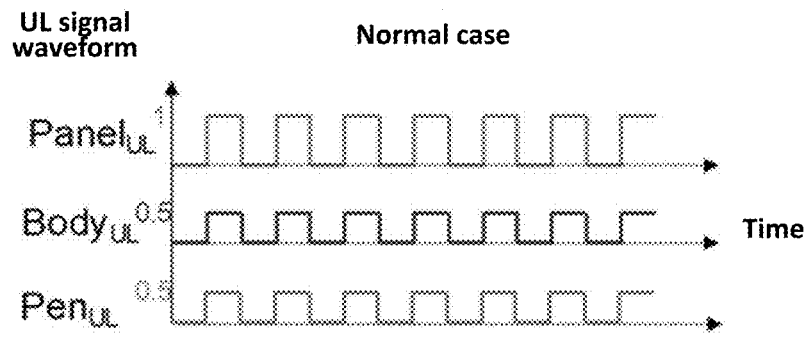
FIGS. 3A-3C each schematically shows a waveform of the UL signal actually received by the active stylus when the user's palm touches the touch panel.
Figure 3B:
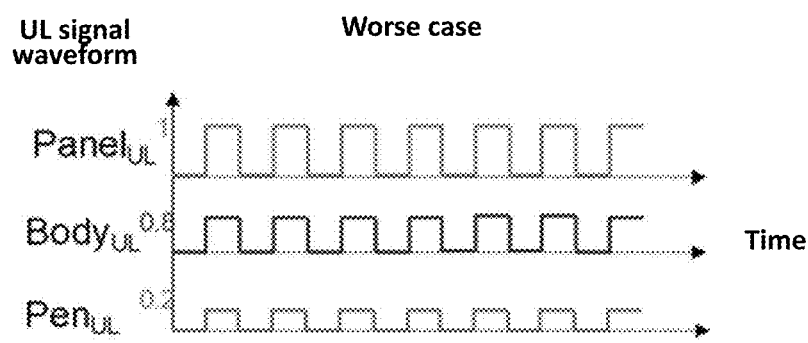
Figure 3C:
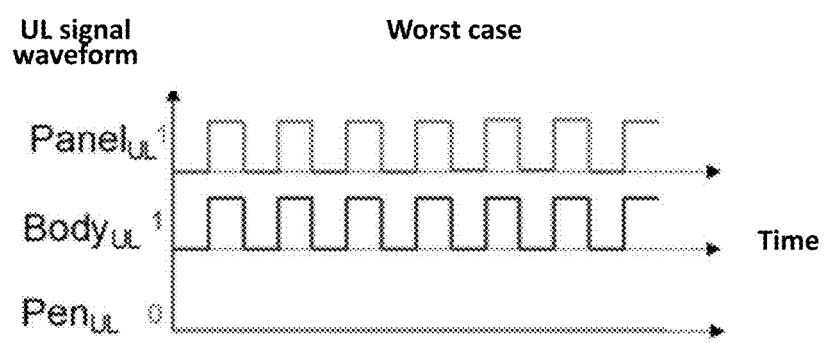

FIGS. 3A-3C each schematically shows a waveform of the UL signal actually received by the active stylus when the user's palm touches the touch panel.

FIG. 3A shows a waveform of the UL signal when the palm of the user's pen-holding hand touches the touch panel within a small area and writes with the active stylus. It can be seen that in this case, existence of the UL interference signal $Body_{UL}$ causes the intensity (shown as a voltage value or amplitude) of the UL signal $Pen_{UL}$ actually received by the active stylus to decrease.

FIG. 3B shows a waveform of the UL signal when the palm of the user's pen-holding hand touches the touch panel within a large area and writes with the active stylus. In this case, the intensity (shown as a voltage value or amplitude) of the UL interference signal $Body_{UL}$ increases, while the intensity of the UL signal $Pen_{UL}$ actually received by the active stylus is lowered.

FIG. 3C shows a waveform of the UL signal when the palm of the user's pen-holding hand touches the touch panel within a large area and the non-pen-holding hand also touches the panel. In this case, the intensity(shown as a voltage value or amplitude) of the UL signal $Pen_{UL}$ actually received by the active stylus may be close to zero, and the active stylus cannot correctly receive the instructions in the UL signal and thus cannot generate the DL signal, so that the touch panel cannot normally display a writing track of the active stylus.

In order to overcome the above problems, in some embodiments of the present application, from a perspective of the touch panel, the touch panel can be partitioned according to a touch position of the tip of the active stylus and a touch position of the human body on the touch panel, and different signals are transmitted to the touch sensing electrodes in different regions. For example, a DC voltage signal is transmitted to the touch sensing electrodes in the touch position of the human body, and a UL signal is transmitted to the touch sensing electrodes in a region corresponding to the touch position of the tip of the active stylus, so that the touch sensing electrodes in the region corresponding to the touch position of the tip of the active stylus can transmit the UL signal to the active stylus. In this way, the intensity of the UL interference signal $Body_{UL}$ can also be reduced, so that the intensity of the UL signal $Pen_{UL}$ actually received by the active stylus can be increased.

However, parasitic capacitances mutually coupled between any two of wires/touch sensing electrodes (common electrode blocks)/gate lines/source lines, etc. in the touch panel are complicated, so it is difficult for the active stylus to receive a UL signal with a maximum intensity by outputting the UL signal according to different partitions, and it may also cause voltages on common electrodes (Vcom) of display pixels in different regions on the touch panel to be inconsistent, resulting in malfunction of the switches and abnormal display effects.

Therefore, an embodiment of the present application further provides an improved solution for the active stylus, which reduces, at the active stylus side, the interference caused by the UL signal coupled to the pen body of the active stylus through the external operating subject (such as a palm, etc.), thereby increasing the intensity of the UL signal actually received by the active stylus without modifying the driving mode for the touch panel. In addition, for a touch display panel that uses the common electrode blocks of the display pixels as the touch sensing electrodes, it is not necessary to transmit the UL signal according to partitions on the touch display panel, and the touch display panel can use a full-driving mode for the UL signal, that is, the UL signal is transmitted through all the touch sensing electrodes on the touch display panel during the UL transmission period of the active stylus, so as to further increase the intensity of the UL signal actually received by the active stylus. The intensity of the UL signal actually received by the active stylus can be correlated with the number of touch sensing electrodes that transmit the UL signal, because the greater the number of touch sensing electrodes that transmit the UL signal, the less likely that a target touch sensing electrode from which the active stylus receives the UL signal needs to provide power to adjacent touch sensing electrodes based on the capacitive coupling effect, which thus can ensure the intensity of the UL signal transmitted by the target touch sensing electrode.

Figure 4:
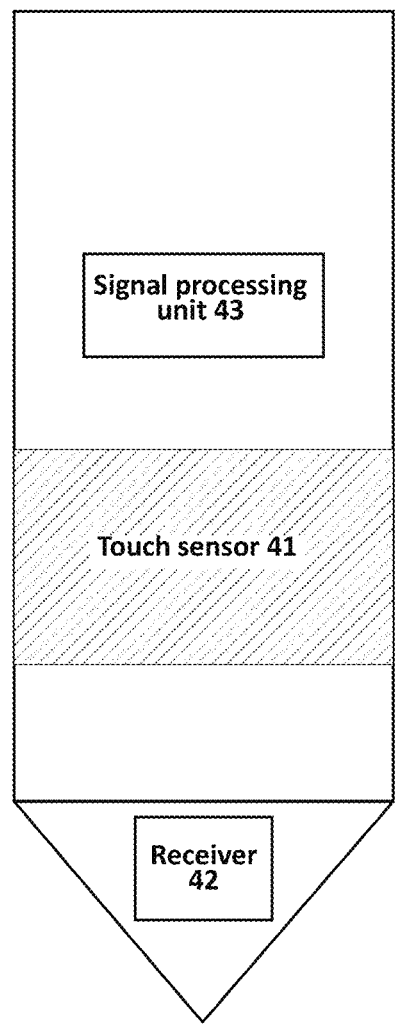
FIG. 4 shows a schematic diagram of a circuit structure of an active stylus according to an embodiment of the present application.

FIG. 4 shows a schematic diagram of a circuit structure of an active stylus according to an embodiment of the present application.

As shown in FIG. 4, an active stylus 40 includes a touch sensor 41, a receiver 42, and a signal processing unit 43.

As shown in FIG. 4, the touch sensor 41 can be arranged inside the active stylus and arranged along at least a portion of an inner surface region of a pen body of the active stylus, wherein, the at least a portion of the inner surface region corresponds to a preset pen-holding region on an outer surface of the pen body, wherein, the touch sensor 41 is insulated from the pen body. The preset pen-holding region is for the external operating subject (such as a human hand, etc.) to hold the pen. The preset pen-holding region can be a region in which the position that the external operating subject often or generally touches when holding the pen is located. Therefore, a pen-holding position of the external operating subject is located at any position within the preset pen-holding region. For example, the preset pen-holding region may cover the whole outer surface of the pen body or a part of the outer surface of the pen body.

Figure 5:
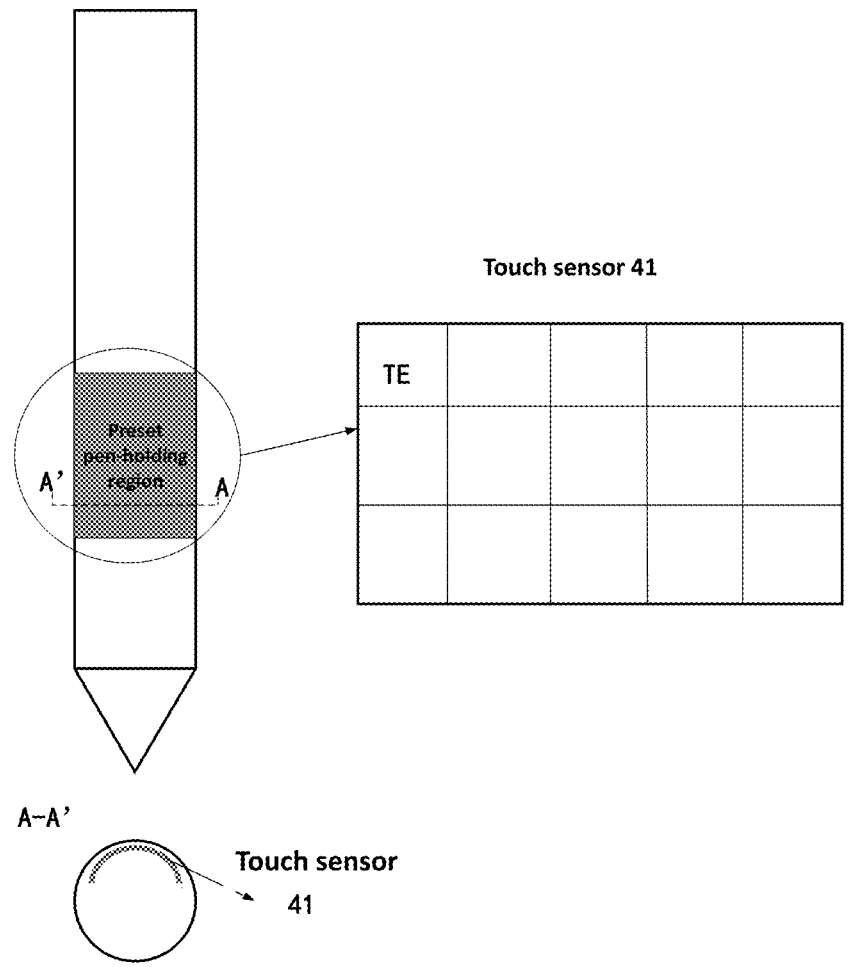
FIG. 5 shows a schematic diagram of an installation position of the touch sensor.

For example, FIG. 5 shows a schematic diagram of an installation position of the touch sensor 41. When the human hand holds the pen, the human hand often or generally touches a position in a certain region on the outer surface of the pen body. Such a region is the preset pen-holding region in the present application, as shown in gray in FIG. 5. FIG. 5 shows an unfolded schematic view of the touch sensor 41 and a cross-sectional view (from A-A') of the active stylus with respect to the touch sensor 41. It can be seen that a portion of the inner surface region of the pen body where the touch sensor 41 is located and the preset pen-holding region both surround a portion of the circumference of the cross section of the pen body, of course, it may also surround the whole circumference of the cross section of the pen body. Optionally, the touch sensor 41 may include a plurality of touch sensing electrodes TE, and be made based on a conductive material such as a flexible circuit board, so as to be arranged inside the active stylus and along the at least a portion of the inner surface of the pen body.

The receiver 42 is configured to receive an uplink (UL) signal from a touch panel. The receiver can be a receiver antenna, for example, arranged near the tip of the active stylus. For example, the touch panel may be a touch panel or a touch display panel in an electronic device, and includes a plurality of touch sensing electrodes. A driving circuit (for example, a TDDI chip) can transmit the UL signal to the plurality of touch sensing electrodes on the touch panel, so that the UL signal is transmitted to the active stylus through the plurality of touch sensing electrodes on the touch panel. The receiver 42 of the active stylus can receive the UL signal.

The touch sensor 41 is insulated from the pen body, and when the external operating subject touches the preset pen-holding region and the external operating subject touches the touch panel, the uplink signal transmitted by the touch panel is coupled to the pen body via the external operating subject (for example, via the human body equivalent capacitance), as an uplink interference signal (Body$_{UL}$).

The system ground (or reference ground) of the signal processing unit 43 is shared by the pen body of the active stylus 40, for example, the compensation signal generated subsequently may use the system ground as a reference. The signal processing unit 43 may be configured to: generate a compensation signal for compensating the UL interference signal (Body$_{UL}$), and obtain a compensated interference signal (Body$_{UL\_NEW}$) generated based on the compensation signal and the UL interference signal; and generate a UL signal to be processed (Pen$_{UL\_NEW}$) based on the received UL signal (Panel$_{UL}$) and the compensated interference signal (Body$_{UL\_NEW}$). Then, the signal processing unit 43 may also obtain UL information based on the UL signal to be processed (Pen$_{UL\_NEW}$). For example, the signal processing unit 43 may decode the UL signal to be processed (Pen$_{UL\_NEW}$) as required, so as to further obtain the UL information.

Optionally, the UL information may be used for guiding generation of a downlink signal.

That is to say, in the embodiment of the present application, in order to reduce the interference of the UL signal (Body$_{UL}$) coupled to the pen body of the active stylus through the external operating subject (such as a human body) on the UL signal (Pen$_{UL}$) actually received by the active stylus, a touch sensor is arranged on the inner surface of the pen body opposite to the preset pen-holding region on the outer surface of the pen body, and a compensation signal is applied to the touch sensor. According to the embodiment of the present disclosure, based on the capacitive coupling effect, the UL interference signal (Body$_{UL}$) coupled to the pen body of the active stylus through the human body equivalent capacitance will form a coupled interference signal (its intensity is substantially close to the intensity of the UL interference signal (Body$_{UL}$), or may be slightly less than the intensity of the UL interference signal due to coupling), and meanwhile, the signal processing unit provides a compensation signal to the touch sensor. In this way, a compensated interference signal with a lower intensity (relative to the UL interference signal (Body$_{UL}$)) can be formed at the touch sensor for subtraction with the intensity of the received UL signal, thereby increasing the intensity of the UL signal actually received by the active stylus (Pen$_{UL\_NEW}$). Specifically, according to an embodiment of the present disclosure, in the signal processing unit 43, the UL interference signal (Body$_{UL}$) may be transmitted to the touch sensor 41 through the capacitive coupling effect between the pen body and the touch sensor, as a coupled interference signal, and a compensation signal is also provided to the touch sensor 41 by the signal processing unit 43, so that the coupled interference signal and the compensation signal form the compensated interference signal at the touch sensor 41. The signal processing unit 43 obtains the compensated interference signal (Body$_{UL\_NEW}$) from the touch sensor 41.

Since the touch sensor includes a plurality of touch sensing electrodes, and the pen-holding position may be different each time, that is, the pen-holding position may be at any of the plurality of touch sensing electrodes, hence the compensation signal needs to be applied to the plurality of touch sensing electrodes. In addition, a compensated interference signal (obtained by combining the compensation signal and the coupling interference signal as mentioned above) will be generated at each touch sensing electrode when the external operating subject holds the pen. Because there is no coupled interference signal or a coupled interference signal with a small amplitude occurring in a part of the touch sensing electrodes which are not touched (typically, the number of the touch sensing electrodes which are not touched is smaller than the touch sensing electrodes which are touched), the amplitude of the compensated interference signal at the touch sensing electrodes corresponding to the current pen-holding position may be slightly smaller than that at other touch sensing electrodes. Then, all the compensated interference signals of the plurality of touch sensing electrodes can be combined into one signal (for example, the plurality of touch sensing electrodes may be connected to a same conducting wire to output the one signal, from which the amplitudes of these compensated interference signals are averaged as the amplitude of the combined signal), as the compensated interference signal finally input to the signal processing unit 43.

The signal processing unit 43 may be implemented by a hardware circuit, a software or a combination thereof, for example, may include a plurality of logic and/or circuit components to implement a signal processing function, and its specific example structure will be described in detail later.

Optionally, the compensation signal may include a DC voltage signal, or the compensation signal may include a signal generated based on the UL signal and having a phase inverse to a phase of the UL signal (an inverted signal of the UL signal, also referred to as an inverted signal). The DC voltage signal or the inverted signal, as the compensation signal, can be used to form, at the touch sensor 41, the compensated interference signal having an intensity (e.g., an amplitude) less than an intensity (e.g., an amplitude) of the UL interference signal.

Figure 6:
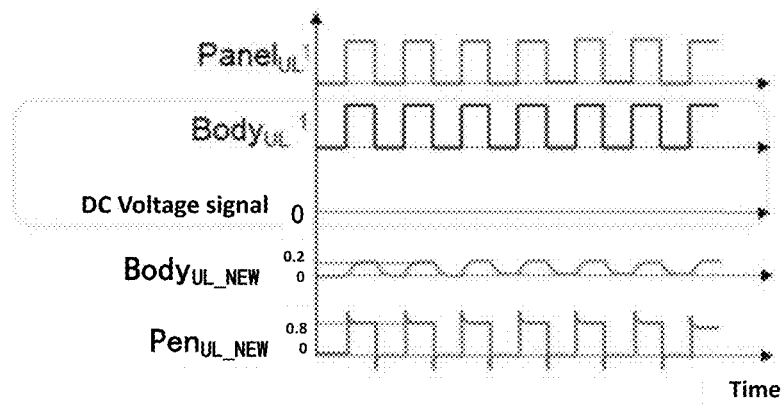
FIGS. 6-8 each shows a schematic diagram of waveforms of respective relevant signals when the compensation signal is a direct current (DC) voltage signal or an inverted signal.
Figure 7:
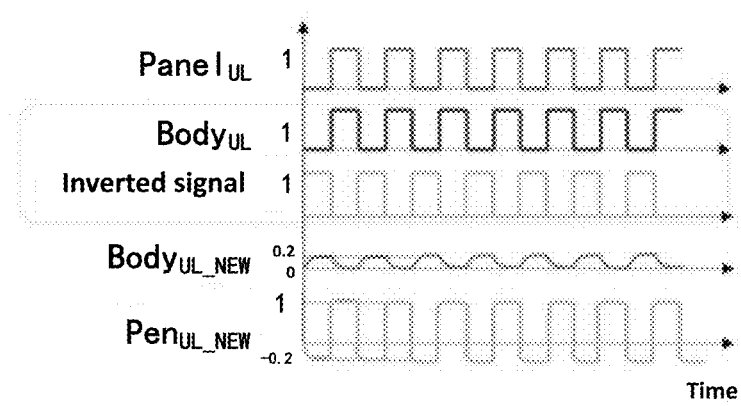
Figure 8:
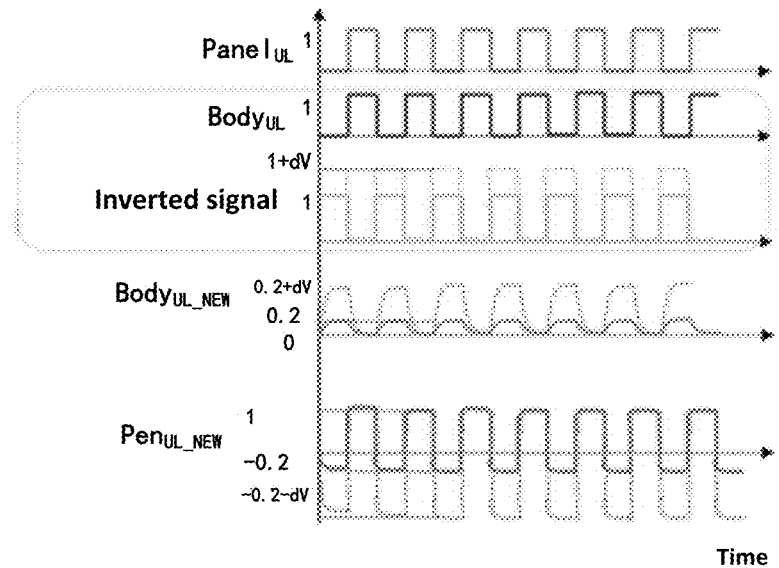

FIGS. 6-8 respectively show schematic diagrams of waveforms of various relevant signals when the compensation signal is a DC voltage signal or an inverted signal. FIGS. 6-8 are all exemplified by taking an example that the intensity of the UL interference signal shown in FIG. 2C or FIG. 3C is too large, resulting in the intensity of the UL signal actually received by the active stylus being too low.

FIG. 6 corresponds to the case where the compensation signal is a DC voltage signal.

As shown in FIG. 6, the UL interference signal (Body$_{UL}$) with a relatively large amplitude will be coupled to the touch sensor (to obtain a coupled interference signal with a substantially same amplitude (the amplitude is also represented as Body$_{UL}$)), and after the coupled interference signal (Body$_{UL}$) is combined with the DC voltage signal (for example, 0V), a compensated interference signal (Body$_{UL\_NEW}$) will be generated at the touch sensor, whose amplitude decreases with respect to that of the UL interference signal (Body$_{UL}$), so it can be known that the amplitude of the UL signal actually received by the active stylus will increase, i.e., Pen$_{UL\_NEW}$ (increase)=Panel$_{UL}$−Body$_{UL\_NEW}$ (decrease). It should be noted that the UL interference signal Body$_{UL}$ coupled to the pen body of the active stylus (and the coupled interference signal further coupled to the touch sensor) is actually a non-ideal square wave signal. FIG. 6 shows the UL interference signal Body$_{UL}$ as a square wave signal for convenience, but in practice there may be a charging-discharging process due to the capacitive coupling effect, and its driving capability is relatively low. The DC voltage signal as the compensation signal is applied to respective touch sensing electrodes of the touch sensor, which can suppress other signals (including the coupled interference signal as described above) coupled to the touch sensing electrodes. For example, the DC voltage signal is a signal with the driving capability, and its potential can be considered as a real reference potential, such as a ground potential. Therefore, after the coupled interference signal and the compensation signal are combined, the amplitude of the compensated interference signal ($Body_{UL\_NEW}$) received from the touch sensing electrodes of the touch sensor is close to the voltage value of the DC voltage signal. Considering a non-ideal effect, the amplitude of the compensated interference signal ($Body_{UL\_NEW}$) depicted in FIG. 6 is not at 0V.

FIG. 7 corresponds to the case where the compensation signal is a signal having a phase inverse to the phase of the UL signal ($Panel_{UL}$) (an inverted signal of the UL signal, also referred to as an inverted signal).

As shown in FIG. 7, the UL interference signal ($Body_{UL}$) with a relatively large amplitude will be coupled to the touch sensor (to obtain a coupled interference signal with a substantially same amplitude (the amplitude is also represented as $Body_{UL}$)), and after the UL interference signal ($Body_{UL}$) is combined with the inverted signal, a compensated interference signal ($Body_{UL\_NEW}$) will be generated at the touch sensor, whose amplitude decreases with respect to the UL interference signal ($Body_{UL}$), so it can be known that the amplitude of the UL signal actually received by the active stylus will increase, i.e., $Pen_{UL\_NEW}$ (increase)=$Panel_{UL}$-$Body_{UL\_NEW}$ (decrease). It should be noted that the UL interference signal $Body_{UL}$ coupled to the pen body of the active stylus (and the coupled interference signal further coupled to the touch sensor) is actually a non-ideal square wave signal. FIG. 7 shows a square wave signal for convenience of, but in practice there may be a charging-discharging process due to the capacitive coupling effect. The inverse signal is applied to respective touch sensing electrodes of the touch sensor 41, which can surpress other signals (including the coupled interference signal) coupled to the touch sensing electrodes, so the amplitude of the compensated interference signal ($Body_{UL\_NEW}$) received from these touch-sensing electrodes is reduced. Considering a non-ideal effect, the amplitude of the compensated interference signal ($Body_{UL\_NEW}$) may not be ideally equal to a result of direct addition of the amplitude of the UL interference signal ($Body_{UL}$) and the amplitude of the inverted signal, so the compensated interference signal ($Body_{UL\_NEW}$) described in FIG. 7 is not at 0V. In addition, because the driving ability of the UL interference signal $Body_{UL}$ is low, and the compensation signal has a driving ability, the amplitude of the compensated interference signal ($Body_{UL\_NEW}$) may be of other values according to the amplitude of the compensation signal.

Optionally, when the compensation signal is an inverted signal, the amplitude of the compensation signal can be fixed (for example, equal to the amplitude of the UL signal) or adjustable, as long as the amplitude of the compensated interference signal ($Body_{UL\_NEW}$) can be reduced. For example, the amplitude of the compensation signal may be adjusted based on a touch area corresponding to the touch of the external operating subject within the preset pen-holding region (which may be equivalent to the touch at a corresponding position of the touch sensor inside the pen body) and/or the amplitude of the UL signal to be processed. Optionally, the touch sensor includes a plurality of touch sensing electrodes arranged in an array, and the touch area corresponding to the touch of the external operating subject within the preset pen-holding region is positively correlated with the number of touch sensing electrodes within the inner surface region corresponding to the touch. For example, if a touch occurs at a first region on the outer surface of the pen body, an inner surface region on the inner surface on an opposite side of the pen body can be determined based on the first region, and within the inner surface region there are two touch sensing electrodes, then, the touch area can be determined based on areas of the two touch sensing electrodes.

For example, the larger the touch area, the greater the interference of the UL interference signal $Body_{UL}$, so a larger amplitude of the compensation signal is required for compensation or cancellation for the coupled interference signal, and vice versa. Additionally or alternatively, if the amplitude of the UL signal to be processed ($Pen_{UL\_NEW}$) is not large enough, it means that the interference of the UL interference signal $Body_{UL}$ is still relatively large, so the amplitude of the compensation signal can be further increased to further reduce the amplitude of the UL interference signal $Body_{UL}$, so that the amplitude of the UL signal to be processed ($Pen_{UL\_NEW}$) meets the requirement.

For example, FIG. 8 corresponds to the case where the compensation signal is an inverted signal and the amplitude of the inverted signal is variable.

As shown in FIG. 8, with respect to the waveform schematic diagram shown in FIG. 7, the amplitudes of the compensation signal (the inverted signal), the compensated interference signal ($Body_{UL\_NEW}$) and the UL signal to be processed ($Pen_{UL\_NEW}$) each include a variation dV, indicating that the amplitude of the compensation signal can be adjusted, so the amplitudes of the compensated interference signal ($Body_{UL\_NEW}$) and the UL signal to be processed ($Pen_{UL\_NEW}$) actually received by the active stylus can also be adjusted.

It can be seen that the active stylus described with reference to FIGS. 4-8 can generate a compensation signal and transmit it to the touch sensing electrodes of the touch sensor 41 within the inner surface region of the pen body corresponding to the pen-holding position. In this way, a compensated interference signal with a lower intensity (relative to the UL interference signal ($Body_{UL}$)) can be formed at the touch sensor for subtraction with the intensity of the received UL signal, so as to increase the intensity of the UL signal actually received by the active stylus.

Various example structures of the signal processing unit will be described in detail below with reference to FIGS. 9-12.

Figure 9:
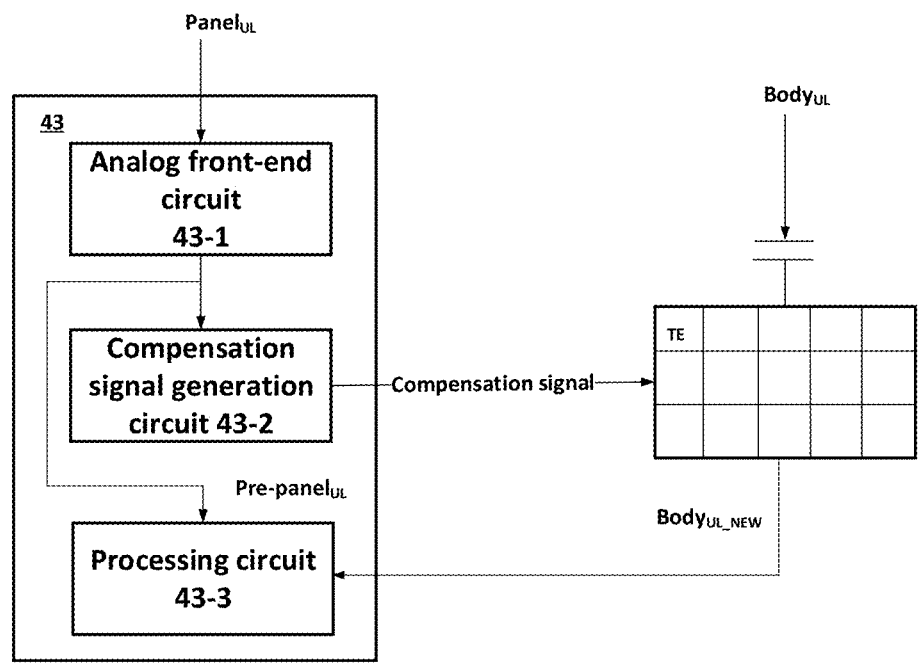
FIG. 9 shows an example structure of a signal processing unit according to an embodiment of the present application.

FIG. 9 shows an example structure of a signal processing unit according to an embodiment of the present application.

As shown in FIG. 9, the signal processing unit 43 includes an analog front-end circuit 43-1, a compensation signal generation circuit 43-2, and a processing circuit 43-3.

The analog front-end circuit 43-1 may be configured to preprocess the received UL signal to obtain a preprocessed UL signal.

For example, the analog front-end circuit 43-1 may include an amplifier and a filter configured to perform power amplification and filtering on the received UL signal ($Panel_{UL}$) (e.g., received through the receiver (such as a receiver antenna) of the active stylus). For ease of description, the preprocessed UL signal obtained is represented as $Pre-Panel_{UL}$.

The compensation signal generation circuit 43-2 is configured to generate a compensation signal. The compensation signal generation circuit 43-2 has a reference ground (system ground), which is the reference ground (system ground) of the signal processing unit and shared with the pen body. In addition, the compensation signal generated by the compensation signal generation circuit 43-2 also needs to be applied to the touch sensor 41 to compensate the coupled interference signal (obtained through the capacitive coupling effect based on the UL interference signal) coupled to the touch sensor 41, so the system ground of the compensation signal generation circuit 43-2 also needs to be insulated from (the touch sensing electrodes of) the touch sensor 41. FIG. 9 shows parasitic capacitance between an external operating subject (e.g., a human body) and the touch sensor.

Optionally, when the compensation signal is a DC voltage signal, the compensation signal generation circuit 43-2 generates the DC voltage signal. For example, the compensation signal generation circuit 43-2 may include a voltage generator (such as a digital power supply, a ground, a voltage regulator or a switching power supply, etc.). When the compensation signal is the aforementioned inverted signal, the compensation signal generation circuit 43-2 generates the compensation signal based on the preprocessed UL signal Panel$_{UL}$, for example, generates a signal having a phase inverse to the phase of the preprocessed UL signal Pre-Panel$_{UL}$ based on the preprocessed UL signal Pre-Panel$_{UL}$, as the compensation signal.

More details of the compensation signal generation circuit will be described in detail below with reference to FIGS. 11-12.

The processing circuit 43-3 is configured to generate a UL signal to be processed (Pen$_{UL\_NEW}$) based on the preprocessed UL signal (Pre-Panel$_{UL}$) and the compensated interference signal (Body$_{UL\_NEW}$).

Figure 10:
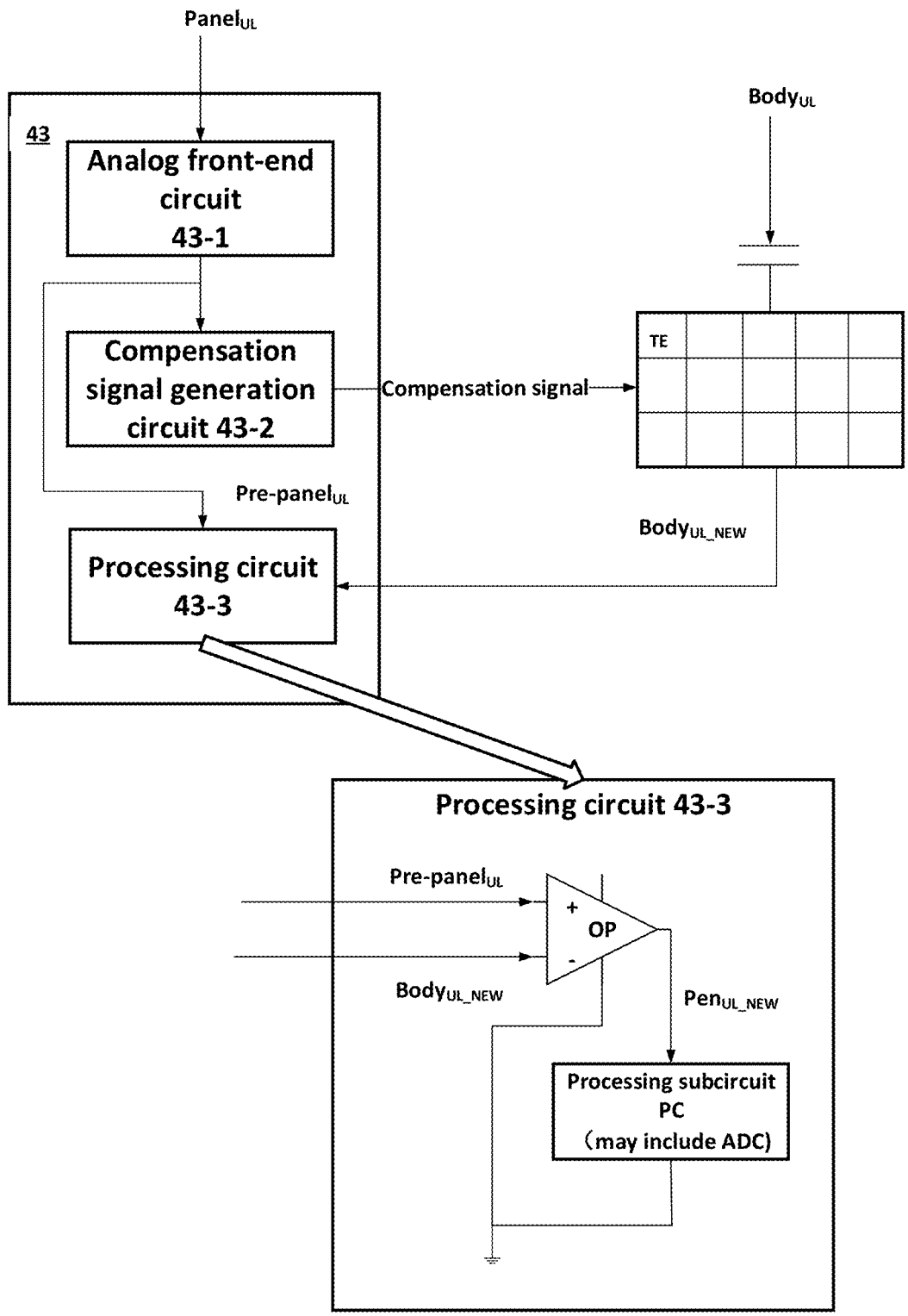
FIG. 10 shows more details of the processing circuit in the signal processing unit on the basis of FIG. 9.

Optionally, the processing circuit 43-3 may include an operational amplifier (OP) and a processing subcircuit (PC). FIG. 10 shows more details of the processing circuit 43-3 in the signal processing unit on the basis of FIG. 9.

As shown in FIG. 10, the compensated interference signal (Body$_{UL\_NEW}$) is input to a first input terminal of the operational amplifier, the preprocessed uplink signal (Pre-Panel$_{UL}$) is input to a second input terminal thereof, and the uplink signal to be processed (Pen$_{UL\_NEW}$) is output from an output terminal thereof. The processing subcircuit (PC) is configured to process the UL signal to be processed (Pen$_{UL\_NEW}$) to obtain UL information based on the UL signal to be processed (Pen$_{UL\_NEW}$), for example, decode the UL signal to be processed (Pen$_{UL\_NEW}$), so that the UL information can be used to generate a downlink signal.

Optionally, the processing subcircuit may include an analog-to-digital converter (ADC), configured to perform an analog-to-digital conversion on the UL signal to be processed (Pen$_{UL\_NEW}$). Or, the analog-to-digital converter (ADC) may exist independently of the processing subcircuit. Of course, if the processing subcircuit has the ability to directly process an analog signal, the analog-to-digital converter can be omitted.

In FIG. 10, since the first input terminal of the operational amplifier receives the compensated interference signal Body$_{UL\_NEW}$, it can be known from the formula Pen$_{UL\_NEW}$=Panel$_{UL}$−Body$_{UL\_NEW}$ that the amplitude of the UL signal actually received by the processing subcircuit of the active stylus, i.e., the amplitude of the UL signal to be processed (Pen$_{UL\_NEW}$) becomes larger, which thus can improve transmission quality of uplink transmission of the active stylus, and help to correctly decode the UL information.

Figure 11:
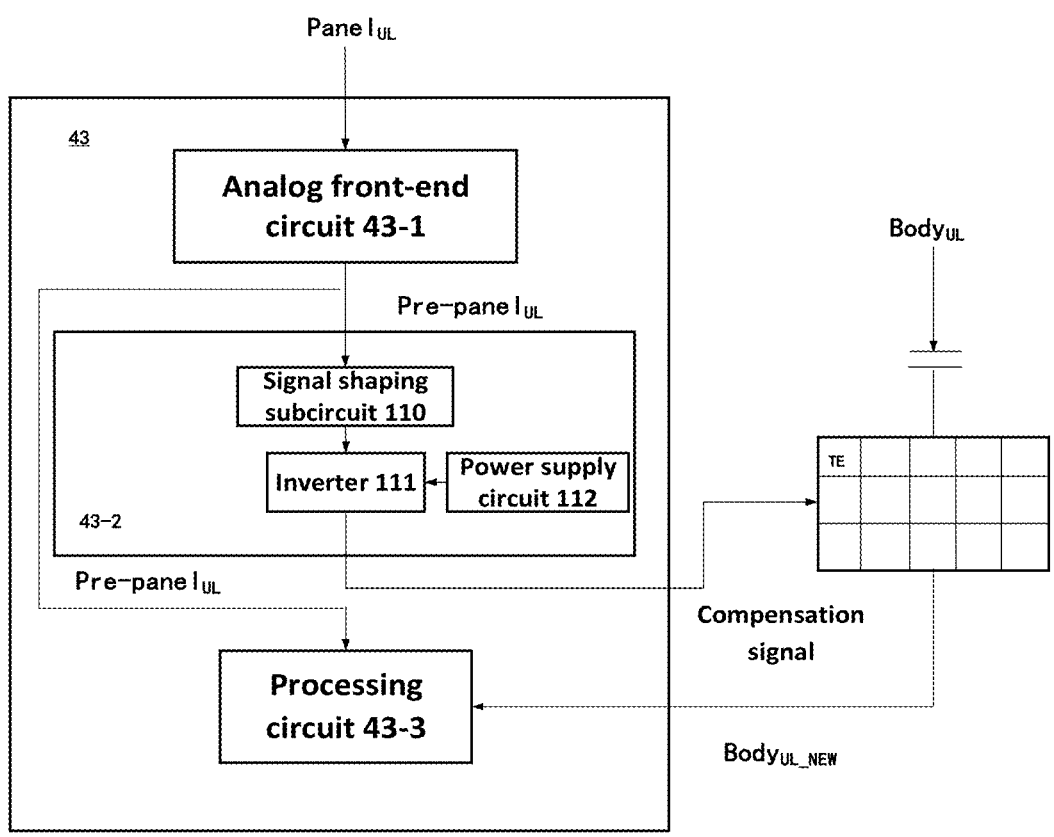
FIG. 11 shows an example structure of a compensation signal generation circuit in FIGS. 9-10 according to an embodiment of the present application.

FIG. 11 shows an example structure of the compensation signal generation circuit in FIGS. 9-10 according to an embodiment of the present application.

When the compensation signal is a DC voltage signal, the structure of the compensation signal generation circuit is relatively simple, such as a common digital power supply, a ground, a voltage regulator or a switching power supply, etc., so the following content is mainly for describing the compensation signal generation circuit that generates an inverted signal. The compensation signal generation circuit 43-2 shown in FIG. 11 can be used to generate an inverted signal (a compensation signal).

As shown in FIG. 11, the compensation signal generation circuit 43-2 may include a signal shaping subcircuit 110 and an inverter 111.

The signal shaping subcircuit 110 may be configured to shape the preprocessed UL signal (Pre-Panel$_{UL}$) from the analog front-end circuit to obtain a shaped UL signal.

For example, the signal shaping subcircuit 110 may be a Schmitt trigger, so as to shape the preprocessed UL signal (Pre-Panel$_{UL}$) into a desired square wave signal as the shaped UL signal.

The inverter 111 may be configured to generate, based on the shaped UL signal, a signal having a phase inverse to a phase of the shaped UL signal as the compensation signal.

Optionally, the inverter 111 needs to be provided with an operating voltage for normal operation, so the compensation signal generation circuit 43-2 may further include a power supply circuit 112, and the power supply circuit 112 may be used to provide an operating voltage for the inverter. Or, the power supply circuit 112 may be located outside the compensation signal generation circuit 43-2. For example, according to different structures of the inverter, the amplitude of the inverted signal obtained after inverting the shaped UL signal may be equal to the amplitude of the shaped UL signal, or equal to other amplitudes, which can be implemented by setting the voltage value of the voltage signal provided by the power supply circuit 112.

Figure 12:
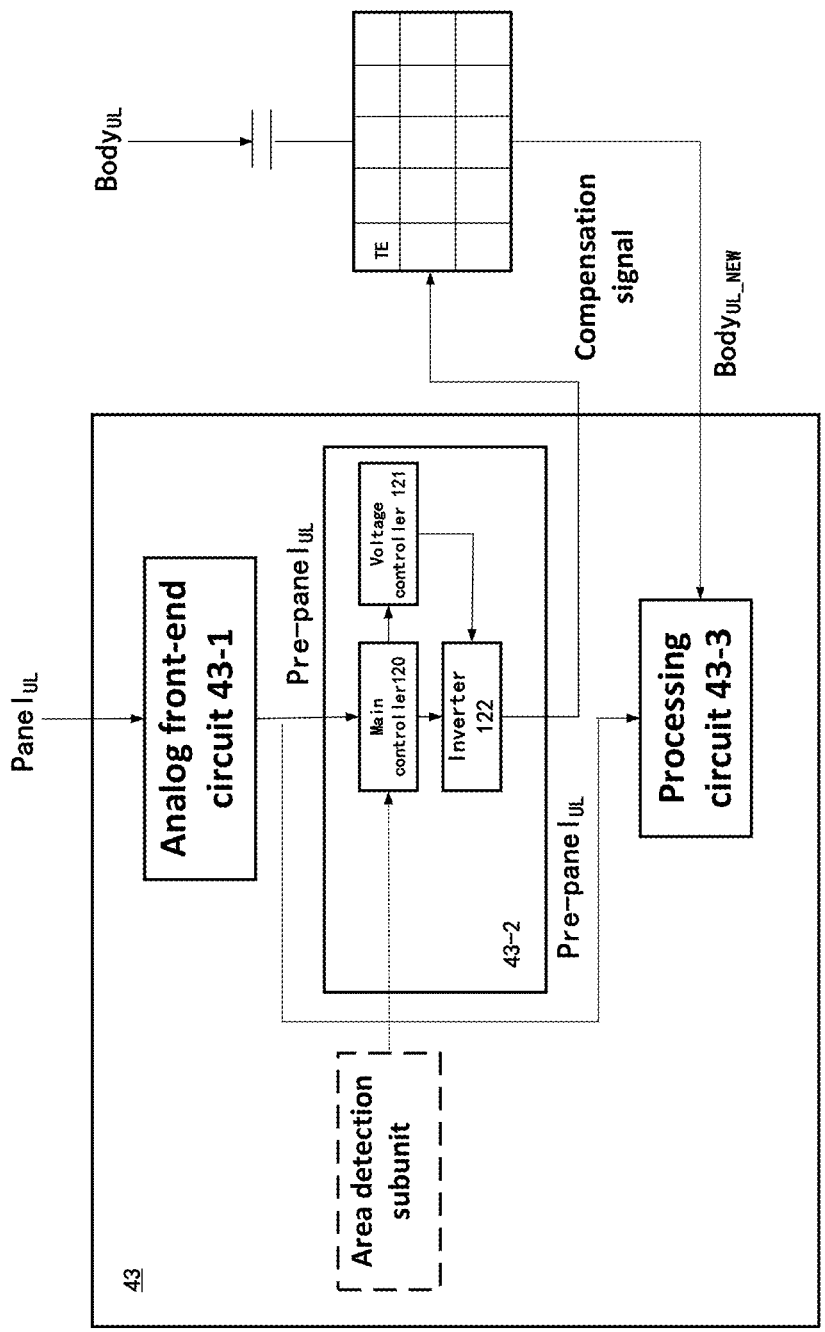
FIG. 12 shows another example structure of the compensation signal generation circuit in FIGS. 9-10 according to an embodiment of the present application.

FIG. 12 shows another example structure of the compensation signal generation circuit in FIGS. 9-10 according to an embodiment of the present application. The compensation signal generation circuit 43-2 shown in FIG. 12 can be used to generate an inverted signal (a compensation signal).

As shown in FIG. 12, the compensation signal generation circuit 43-2 may include a main controller 120, a voltage controller 121, and an inverter 122.

The main controller 120 may be configured to determine the amplitude of the compensation signal, and transmit a voltage regulating signal to the voltage controller 121 based on the determined amplitude of the compensation signal. Optionally, the main controller 120 may include an analog-to-digital converter (ADC) to convert the preprocessed UL signal from the analog front-end circuit into a digital signal for subsequent processing.

The voltage controller 121 can be configured to generate an operating voltage for the inverter 122 based on the voltage regulating signal from the main controller.

The inverter 122 may be configured to generate, based on the preprocessed UL signal, a signal having a phase inverse to the phase of the preprocessed UL signal as the compensation signal. Optionally, the amplitude of the compensation signal is the same as the amplitude of the preprocessed UL signal, or is equal to other amplitude, which can depend on the operating voltage generated by the voltage controller 121.

In some examples, the main controller 120 may transmit a voltage regulating signal with a default value to the voltage controller 121, so that the inverter 122 generates a compensation signal with a corresponding amplitude based on the operating voltage output by the voltage controller. Optionally, in other examples, after obtaining the UL signal to be processed ($Pen_{UL\_NEW}$) in the processing circuit, the main controller 120 obtains the UL signal to be processed from the processing circuit and determines its amplitude. When the determined amplitude is small, it indicates that the interference is still large, so a voltage regulating signal can be generated to increase the amplitude of the compensation signal, otherwise, the amplitude of the compensation signal can be reduced or kept unchanged. That is to say, the main controller can dynamically adjust the amplitude of the compensation signal according to the amplitude of the UL signal actually received by the active stylus (the UL signal to be processed ($Pen_{UL\_NEW}$)), thereby increasing the amplitude of the UL signal actually received by the active stylus.

In the present application, the main controller and/or the voltage controller may be formed by a microcontroller MCU, a digital processor DSP, or an electronic circuit, or the like or a combination thereof.

In another aspect, on the basis that the amplitude of the compensation signal can be variable, the amplitude of the compensation signal can also be further adjusted based on the touch area of the external operating subject within the preset pen-holding region, in addition to based on the amplitude of the UL signal to be processed, as described above. It should be understood that when the external operating subject touches a certain position within the preset pen-holding region, a value of an electric signal in at least a portion of the touch sensing electrodes of the touch sensor in the active stylus will change.

In this case, as shown by a dotted line box in FIG. 12, the signal processing unit 43 may further include an area detection subunit configured to determine the touch area of the external operating subject within the preset pen-holding region based on the electric signal from the touch sensor. In this way, the main controller 120 can generate the voltage regulating signal based on the detected touch area and/or the amplitude of the UL signal to be processed, so as to adjust the amplitude of the compensation signal, thereby increasing the amplitude of the UL signal to be processed. In this way, even if the external operating subject may hold the active stylus differently, which results in different touch areas, the amplitude of the UL signal to be processed can be at a more appropriate value by adjusting the amplitude of the compensation signal, so that the UL information can be easily decoded.

Optionally, the area detection subunit may include a touch detection circuit connected to respective touch sensing electrodes of the touch sensor 41. For example, the touch detection circuit determines which touch sensing electrode(s) correspond to a position where the touch occurs an outer surface by detecting the capacitance changes or inductance changes of touch sensing electrodes, and determines the touch area according to the determined number of touch sensing electrodes.

In addition, in the case of including a touch detection circuit, the compensated interference signal can also be obtained in the following ways. For example, the compensation signal may be applied to only the touch sensing electrodes where a touch occurs detected by the touch detection circuit, and then the compensated interference signals at these touch sensing electrodes are combined (for example, the average amplitude for the compensated interference signals is calculated) to obtain the one compensated interference signal finally provided to the processing circuit 43-3.

It can be seen that, by using the active stylus provided by the embodiment of the present application, a touch sensor is provided inside the active stylus, and by generating a compensation signal and transmitting it to touch sensing electrodes of the touch sensor inside the active stylus, a compensated interference signal with a lower intensity (relative to the UL interference signal ($Body_{UL}$)) can be formed at the touch sensor for subtraction with the intensity of the received UL signal, to increase an intensity of the UL signal actually received by the active stylus without modifying a driving mode for the touch panel. Therefore, during a UL transmission period of the active stylus, all touch sensing electrodes on the touch panel can transmit the UL signal, which also improves the intensity of the UL signal received by the active stylus. In addition, the structure of the signal processing unit including the compensation signal generation circuit configured to generate a compensation signal is relatively simple, and what are adopted are all common circuit components.

According to another aspect of the present application, there is provided a method performed by an active stylus.

Figure 13:
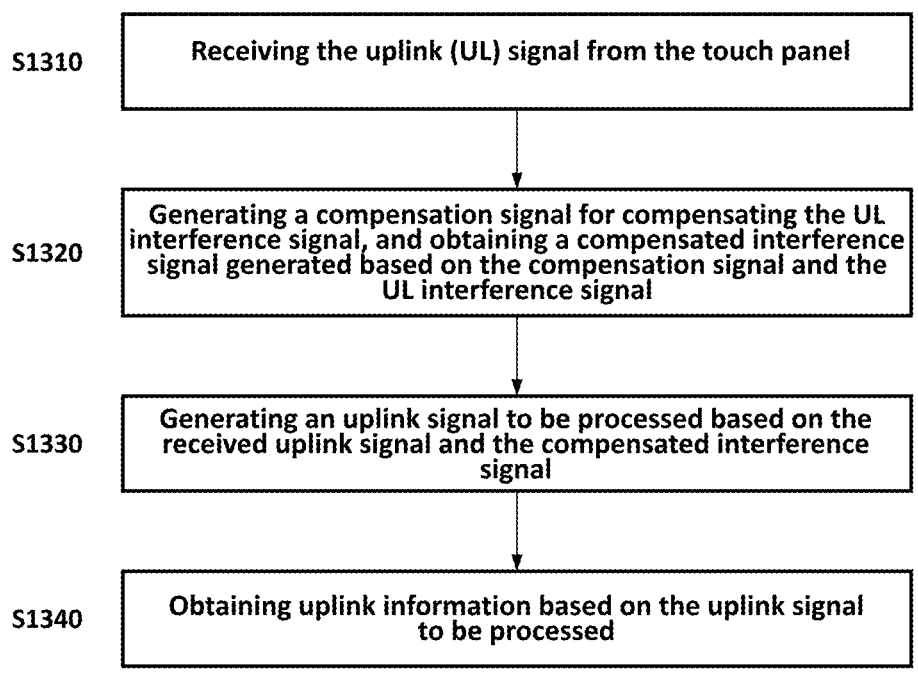
FIG. 13 shows a flow chart of a method performed by an active stylus according to an embodiment of the present application.

FIG. 13 shows a flow chart of a method performed by an active stylus according to an embodiment of the present application, wherein, the active stylus includes a touch sensor arranged inside the active stylus and along at least a portion of an inner surface region of the pen body, the at least a portion of the inner surface region corresponding to a preset pen-holding region of an outer surface of the pen body, wherein, the touch sensor is insulated from the pen body, and when an external operating subject touches the preset pen-holding region and the external operating subject touches a touch panel, an uplink signal transmitted by the touch panel is coupled to the pen body via the external operating subject, as an uplink interference signal ($Body_{UL}$).

As shown in FIG. 13, a method 1300 may include steps S1310-S1340.

In the step S1310, an uplink signal is received from the touch panel.

For example, the uplink signal is received from the touch panel by the receiver (e.g., a receiver antenna) of the active stylus. Optionally, the received uplink signal may also be preprocessed (such as amplified and filtered).

In the step S1320, a compensation signal for compensating the uplink interference signal is generated, and a compensated interference signal generated based on the compensation signal and the uplink interference signal is obtained.

For example, a coupled interference signal is generated at the touch sensor from the uplink interference signal through a capacitive coupling effect between the pen body and the touch sensor, and the compensation signal is provided to the touch sensor, and then a compensated interference signal is generated on the touch sensor based on the coupled interference signal and the compensation signal, so that a compensated interference signal generated based on the compensation signal and the uplink interference signal (i.e., the coupled interference signal) can be obtained from the touch sensor.

For example, the compensation signal may be a DC voltage signal or a signal having a phase inverse to the phase of the received uplink signal.

In the step S1330, an uplink signal to be processed is generated based on the received uplink signal and the compensated interference signal.

In the step S1340, uplink information is obtained based on the uplink signal to be processed.

For example, it can be known from the formula $Pen_{UL\_NEW} = Panel_{UL} - Body_{UL\_NEW}$ that the amplitude of the compensated interference signal $Body_{UL\_NEW}$ is reduced compared to the amplitude of the uplink interference signal $Body_{UL}$ when no compensation signal is used, and the amplitude of the received uplink signal $Panel_{UL}$ is substantially unchanged, so the amplitude of the uplink signal to be processed $Pen_{UL\_NEW}$ will become larger, which thus can improve transmission quality of uplink transmission of the active stylus, and help to correctly decode the UL information; and the decoded uplink information may indicate generation of a downlink signal.

For more details of the method performed by the active stylus, reference may be made to what is described above about the active stylus with reference to FIGS. 4-12, so repeated descriptions thereof are omitted here.

Correspondingly, by using the method performed by the active stylus, by generating a compensation signal and transmitting it to touch sensing electrodes of the touch sensor inside the active stylus, a compensated interference signal with a lower intensity (relative to the UL interference signal ($Body_{UL}$)) can be formed at the touch sensor for subtraction with the intensity of the received UL signal, to increase an intensity of the UL signal actually received by the active stylus without modifying a driving mode for the touch panel. Therefore, during a UL transmission period of the active stylus, all touch sensing electrodes on the touch panel can transmit the UL signal, which also increases the intensity of the UL signal received by the active stylus.

In addition, the method performed by the active stylus as described above may be performed by the signal processing unit in FIG. 4. The signal processing unit may be implemented by a hardware circuit, a software or a combination thereof. Or, in a case that the signal processing unit includes software, the method performed by the active stylus may be implemented by a program executable by the signal processing unit in FIG. 4, wherein, the program can be stored in a non-transitory computer-readable medium.

The non-transitory computer-readable medium does not refer to a medium that temporarily stores data such as a register, a cache, or a memory, but refers to a computer-readable medium that stores data semi-permanently. Specifically, the above-mentioned various applications or programs can be stored and set in a non-transitory computer-readable medium such as a compact disc (CD), a digital versatile disc (DVD), a hard disk, a Bluetooth, a universal serial bus (USB), a memory card, a read-only memory (ROM), etc.

While the present disclosure has been shown and described with reference to various embodiments thereof, it will be understood by those skilled in the art that, without departing from the spirit and scope of the present disclosure as defined by the claims and their equivalents, various changes in form and details can be made thereto.

The invention claimed is:

1. An active stylus, comprising:
a touch sensor, arranged inside the active stylus and along at least a portion of an inner surface region of a pen body of the active stylus, the at least a portion of the inner surface region corresponding to a preset pen-holding region on an outer surface of the pen body, wherein, the touch sensor is insulated from the pen body, and when an external operating subject touches the preset pen-holding region and touches a touch panel, an uplink signal transmitted by the touch panel is coupled to the pen body via the external operating subject, as an uplink interference signal;
a receiver, configured to receive the uplink signal from the touch panel; and
a signal processing unit, configured to:
generate a compensation signal for compensating the uplink interference signal, and obtain a compensated interference signal generated based on the compensation signal and the uplink interference signal;
generate an uplink signal to be processed based on the received uplink signal and the compensated interference signal; and
obtain uplink information based on the uplink signal to be processed.

2. The active stylus according to claim 1, wherein,
a coupled interference signal is formed at the touch sensor from the uplink interference signal through a capacitive coupling effect between the pen body and the touch sensor;
the compensation signal is provided to the touch sensor by the signal processing unit; and
the coupled interference signal and the compensation signal form the compensated interference signal at the touch sensor.

3. The active stylus according to claim 2, wherein, the compensation signal comprises a DC voltage signal, and the DC voltage signal and the coupled interference signal form the compensated interference signal having a smaller amplitude than that of the uplink interference signal at the touch sensor.

4. The active stylus according to claim 2, wherein, the compensation signal comprises a signal having a phase inverse to a phase of the uplink signal, and the signal having a phase inverse to the phase of the uplink signal and the coupled interference signal form the compensated interference signal having a smaller amplitude than that of the uplink interference signal at the touch sensor.

5. The active stylus according to claim 4, wherein, the signal processing unit is further configured to:
adjust an amplitude of the compensation signal based on a touch area corresponding to a touch by the external operating subject within the preset pen-holding region and/or an amplitude of the uplink signal to be processed.

6. The active stylus according to claim 5, wherein, the touch sensor comprises a plurality of touch sensing electrodes arranged in an array,
the touch area corresponding to the touch of the external operating subject in the preset pen-holding region is positively correlated with a number of touch sensing electrodes within an inner surface region corresponding to the touch.

7. The active stylus according to claim 4, wherein, the signal processing unit comprises:
an analog front-end circuit, configured to preprocess the received uplink signal to obtain a preprocessed uplink signal;
a compensation signal generation circuit, configured to generate the compensation signal based on the preprocessed uplink signal; and
a processing circuit, configured to generate the uplink signal to be processed based on the preprocessed uplink signal and the compensated interference signal.

8. The active stylus according to claim 7, wherein, the compensation signal generation circuit comprises:

a signal shaping subcircuit, configured to shape the preprocessed uplink signal to obtain a shaped uplink signal; and an inverter, configured to generate, based on the shaped uplink signal, a signal having a phase inverse to a phase of the shaped uplink signal as the compensation signal.

9. The active stylus according to claim 7, wherein, the compensation signal generation circuit comprises:

a main controller, configured to determine an amplitude of the compensation signal, and transmit a voltage regulating signal to a voltage controller based on the determined amplitude of the compensation signal;

the voltage controller, configured to generate an operating voltage of an inverter based on a voltage regulating signal from the main controller; and the inverter, configured to generate, based on the preprocessed uplink signal, a signal having a phase inverse to a phase of the preprocessed uplink signal as the compensation signal.

10. The active stylus according to claim 9, wherein, the signal processing unit further comprises:

an area detection subunit, configured to determine a touch area corresponding to a touch of the external operating subject within the preset pen-holding region based on an electric signal from the touch sensor;

wherein, the main controller further generates the voltage regulating signal based on the detected touch area and/or the amplitude of the uplink signal to be processed.

11. The active stylus according to claim 3, wherein, the signal processing unit comprises:

an analog front-end circuit, configured to preprocess the received uplink signal to obtain a preprocessed uplink signal;

a compensation signal generation circuit, configured to generate the DC voltage signal; and a processing circuit, configured to generate the uplink signal to be processed based on the preprocessed uplink signal and the compensated interference signal.

12. The active stylus according to claim 11, wherein, the compensation signal generation circuit comprises a voltage generator configured to generate the DC voltage signal.

13. The active stylus according to claim 7, wherein, the analog front-end circuit comprises:

an amplifier and a filter, configured to perform power amplification and filtering on the uplink signal to obtain the preprocessed uplink signal.

14. The active stylus according to claim 7, wherein, the processing circuit comprises:

an operational amplifier, wherein, the compensated interference signal is input to a first input terminal of the operational amplifier, the preprocessed uplink signal is input to a second input terminal thereof, and the uplink signal to be processed is output from an output terminal thereof; and a processing subcircuit, configured to process the uplink signal to be processed to obtain the uplink information.

15. The active stylus according to claim 1, wherein, the receiver comprises a receiver antenna.

16. A method performed by an active stylus, the active stylus comprising a touch sensor arranged inside the active stylus and along at least a portion of an inner surface region of a pen body of the active stylus, and the at least a portion of the inner surface region corresponding to a preset pen-holding region on an outer surface of the pen body, wherein, the touch sensor is insulated from the pen body, and when an external operating subject touches the preset pen-holding region and touches a touch panel, an uplink signal transmitted by the touch panel is coupled to the pen body via the external operating subject, as an uplink interference signal, the method comprising:

receiving the uplink signal from the touch panel;

generating a compensation signal for compensating the uplink interference signal, and obtaining a compensated interference signal generated based on the compensation signal and the uplink interference signal;

generating an uplink signal to be processed based on the received uplink signal and the compensated interference signal; and obtaining uplink information based on the uplink signal to be processed.

\* \* \* \* \*